US012757235B2

(12) United States Patent
Dreiling et al.

(10) Patent No.: US 12,757,235 B2
(45) Date of Patent: Oct. 6, 2026

(54) MANAGING CAPABILITY INFORMATION FOR OVERHEAD REDUCTION

(71) Applicant: T-Mobile Innovations LLC, Overland Park, KS (US)

(72) Inventors: Ryan Patrick Dreiling, Shawnee, KS (US); Christopher Bailey, Overland Park, KS (US)

(73) Assignee: T-Mobile Innovations, LLC, Overland Park, KS (US)

(*) Notice: Subject to any disclaimer, the term of this patent is extended or adjusted under 35 U.S.C. 154(b) by 429 days.

(21) Appl. No.: 18/179,714

(22) Filed: Mar. 7, 2023

(65) Prior Publication Data

US 2024/0306172 A1 Sep. 12, 2024

(51) Int. Cl.
*H04W 72/51* (2023.01)
*H04W 8/22* (2009.01)
*H04W 24/02* (2009.01)

(52) U.S. Cl.
CPC ............. *H04W 72/51* (2023.01); *H04W 8/22* (2013.01); *H04W 24/02* (2013.01)

(58) Field of Classification Search
CPC ....... H04W 72/51; H04W 8/22; H04W 24/02; H04W 8/24
See application file for complete search history.

(56) References Cited

U.S. PATENT DOCUMENTS

| | | | | |
|---|---|---|---|---|
| 9,094,829 B2 * | 7/2015 | Chen | ..................... | H04W 48/02 |
| 10,567,995 B2 * | 2/2020 | Kawasaki | ............. | H04W 76/19 |
| 12,058,776 B2 * | 8/2024 | Lindheimer | ........ | G06F 16/2255 |
| 2018/0317218 A1 * | 11/2018 | Li | ......................... | H04W 72/51 |
| 2019/0239064 A1 | 8/2019 | Stojanovski et al. | | |
| 2020/0351646 A1 * | 11/2020 | Casati | ..................... | H04W 8/24 |
| 2021/0352467 A1 | 11/2021 | Palat et al. | | |
| 2022/0312298 A1 * | 9/2022 | Palle Venkata | ......... | H04W 8/24 |

(Continued)

FOREIGN PATENT DOCUMENTS

| | | | | |
|---|---|---|---|---|
| CN | 101384057 A * | 3/2009 | | |
| CN | 112840687 A * | 5/2021 | ........... | H04W 72/51 |
| WO | WO-2012178055 A1 * | 12/2012 | ............. | H04L 69/16 |

OTHER PUBLICATIONS

CN-112840687-A Translation (Year: 2021).*
CN-101384057-A Translation (Year: 2009).*

*Primary Examiner* — George Eng
(74) *Attorney, Agent, or Firm* — Jones Burke, PLLC

(57) ABSTRACT

Systems and methods are provided for reducing overhead associated with user equipment (UE) capability information messages in order to improve overall network performance. A UE capability repository system includes a repository storing information correlating identifying characteristics of the UE with capabilities of the UE. In response to a connection request from a particular UE, the connection request including the identifying characteristics for the particular UE, the UE capability repository is searched for capabilities correlated with the identifying characteristics for the particular UE. Upon finding the capabilities correlated with the identifying characteristics, the UE capability repository system provides an access node with the capabilities, thereby avoiding sending of a UE capability enquiry message by the access node and the generation of a UE capability information message from the UE.

16 Claims, 10 Drawing Sheets

(56) References Cited

U.S. PATENT DOCUMENTS

| | | | | |
|---|---|---|---|---|
| 2024/0073675 | A1* | 2/2024 | Hill | H04W 76/10 |
| 2024/0080656 | A1* | 3/2024 | Ma | H04W 76/16 |
| 2025/0261240 | A1* | 8/2025 | Li | H04W 74/0833 |
| 2025/0337647 | A1* | 10/2025 | Zhang | H04L 41/0853 |

* cited by examiner

MANAGING CAPABILITY INFORMATION FOR OVERHEAD REDUCTION

TECHNICAL BACKGROUND

A wireless network, such as a cellular network, can include a core network and a radio access network (RAN) serving multiple wireless devices or user equipment (UE) in a geographical area covered by a radio frequency transmission provided by the access network. As technology has evolved, different carriers within the cellular network may utilize different types of radio access technologies (RATs). RATs can include, for example, third generation (3G) RATs (e.g., WCDMA, UMTS, CDMA etc.), fourth generation (4G) RATs (e.g., WiMax, Long Term Evolution (LTE), etc.), and fifth generation (5G) RATs (new radio (NR)). Further, different types of access nodes may be implemented within the access network for deployment for the various RATs. For example, an evolved NodeB (eNB) may be utilized for 4G RATs and a next generation NodeB (gNB) may be utilized for 5G RATs. Deployment of the evolving RATs in a network provides numerous benefits. For example, newer RATs may provide additional resources to subscribers, faster communications speeds, and other advantages.

As access nodes have evolved, networks may include a combination of multiple access node such as 4G LTE eNBs and 5G NR next generation gNBs or alternatively may be exclusively 4G or 5G cellular systems. The evolution of 5G RATs has resulted in significant network architectural developments. For example, the 5G core network offers a serviced based architecture (SBA). The 5G core network is delivered through a set of interconnected network functions (NFs). The NFs are able to access the services of the other NFs in the core network. This is contrast to the 4G LTE evolved packet core (EPC), which implements a fixed-function, hard-wired architecture.

In attaching to a 4G or 5G network, each wireless devices or UE transmits information to the access node regarding its identity and capabilities including 4G/5G features it supports, so that the network can best utilize the features and capabilities of the UE. For example, the UE may signal to the network, via a UE capability information message, multiple information types, such as, for example, which LTE bands it supports, which RATs it is capable of using, which carrier aggregation combinations it supports, modulation schemes, multiple-input multiple-output (MIMO) support, and the power class of the UE.

The UE does not send the UE capability report or information message unsolicited. Instead, the access node first sends to the UE a UE capability enquiry message. The UE capability enquiry message instructs the UE to send the UE capability information message and further may specify which technology to report upon, frequency bands, and other configurations. In some RAN vendor implementations, the eNB/gNB requests the UE to send the UE capability information message on every radio resource configuration (RRC) connection. The length of the UE capability information message has increased as the number of capabilities and features the UE needs to advertise continues to grow.

The UE capability information message is an RRC message that the UE sends to the network, in most cases, during an initial registration process. As technology has evolved and additional features and capabilities have been added to wireless devices, the UE capability information message has become lengthy and complicated. As set forth above, the UE capability information message contains information including, for example, RATs that the UE supports, which frequency bands it supports, which carrier aggregation combinations it supports, modulations schemes, MIMO support, and the power class of the UE. UEs supporting a large number of frequency bands and multiple combinations of the frequency bands will have longer capability messages than other UEs having fewer capabilities. Further, each release of LTE adds its own feature group indicator (FGI), thus increasing the size of the UE capability information message relative to the previous release.

Lengthy UE capability information message increase overhead on wireless communications links and thus potentially negatively impact quality of service (QOS) for wireless devices. Thus, existing methods requiring transmission of a UE capability information message for each UE in virtually every circumstance are detrimental to network performance. Overhead and signaling would be reduced and capacity would be saved if the number of UE capability information messages were limited. A solution is thus needed for reducing the overhead created by transmission of increasingly large UE capability information messages.

OVERVIEW

Exemplary embodiments described herein include systems, methods, and non-transitory computer readable mediums for reducing overhead creating by transmission of lengthy UE capability information messages. An exemplary method includes maintaining, in a memory device operating within a wireless network, a user equipment (UE) capability repository storing information correlating identifying characteristics of a UE with capabilities of the UE. The method additionally includes receiving a connection request from a particular UE that includes identifying characteristics for the particular UE and searching the UE capability repository for capabilities correlated with the identifying characteristics for the particular UE in response to a connection request from a particular UE. The method further includes providing an access node with the capabilities upon finding the capabilities in the capability repository, thereby avoiding sending of a UE capability enquiry message by the access node.

An additional exemplary embodiment includes an access node including a memory device storing a user equipment (UE) capability repository correlating identifying characteristics of user equipment with capabilities of the UE. The access node further includes a processing device performing multiple operations. The operations include searching the UE capability repository for capabilities correlated with the identifying characteristics for the particular UE in response to a connection request from a particular UE. The connection request includes the identifying characteristics for the particular UE. Upon finding the capabilities correlated with the identifying characteristics, the operations include providing an access node with the capabilities. Further, upon failure to find the capabilities correlating with the identifying characteristics, the operations include triggering sending of a UE capability information message to the access node from the particular UE, receiving the UE capability information message, and updating the UE capability repository with the capabilities contained in the UE capability information message.

Yet an additional exemplary embodiment includes a non-transitory computer readable medium, programmed to perform multiple operations. The operations include in response to a connection request from a particular user equipment (UE), the connection request including identifying characteristics for the particular UE, searching a UE capability repository for capabilities correlated with the identifying characteristics for the particular UE. Upon finding the capabilities correlated with the identifying characteristics, the operations include providing an access node with the capabilities. Upon failure to find the capabilities correlating with the identifying characteristics, the operations include triggering sending of a UE capability information message to the access node from the particular UE, receiving the UE capability information message, and updating the UE capability repository with the capabilities contained in the UE capability information message.

DETAILED DESCRIPTION

Figure 1:
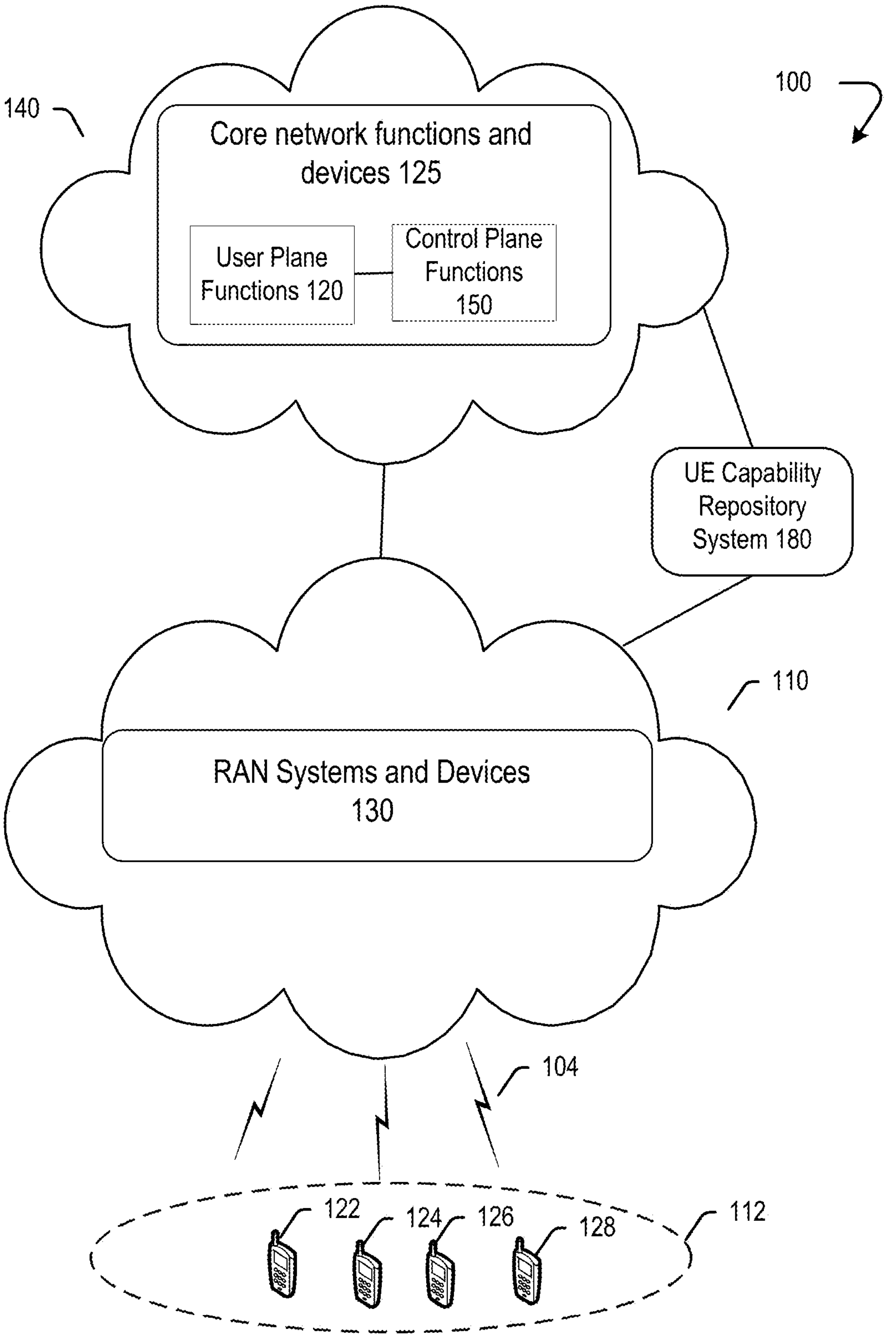
FIG. 1 depicts an exemplary system for wireless communication, in accordance with the disclosed embodiments.

Exemplary embodiments described herein include systems, methods, and computer readable mediums for reducing overhead created by the sending of increasingly large UE capability messages. In particular, embodiments set forth herein include utilizing identifying information of wireless devices in order to reduce the number of UE capability enquiry messages and UE capability information messages generated within a network.

In embodiments provided herein, enhanced logic operates to create a UE capability repository. When wireless devices request connection to the network, a processor compares identifying characteristics of the requesting wireless devices to information stored in the UE capability repository to determine if a UE capability information message has already been received for a wireless device having the same identifying characteristics as a wireless device currently requesting to connect to the network. If a match is found, it is not necessary for the wireless device requesting connection to send a UE capability information message.

In operation, during attach procedures, when wireless devices connect to a network, the network requests identifying information from the wireless device. For example, the network requests an International Mobile Equipment Identity (IMEI) number and an IMEI software version (IMEI_SV). The IMEI number is a serial number that the manufacturer assigns to cellular devices. Just as people have their own ID number and every car has a vehicle number, wireless devices can be precisely identified by the IMEI number. The IMEI is a 15-digit unique number. The IMEI_SV is a two digit code appended and sent along with the IMEI by the UE to the network. This parameter is used to indicate a software version of the wireless device.

The IMEI number has 15 digits. The number is typically arranged in a sequence of WW-XXXXXX-YYYYYY-Z. The TAC is the initial eight-digit portion of the 15-digit IMEI code used to identify wireless devices. IMEI TACs are assigned to UE device manufacturers. UE device manufacturers use the different IMEI TAC ranges for different device models. The digits YYYYYY act as an identifier for the particular device. Z is a check digit, which is zero for all Global System for Mobiles (GSM) devices, this is zero.

The IMEI number is used to identify the device type and to verify that the device make and model are approved. The fact that a reporting body has allocated a TAC is an indication that the device, modem, or module has passed relevant regulatory scrutiny. Using that TAC, the network can approve the device and signal that it is permitted to be connected.

Therefore, in embodiments described herein, from the received IMEI and the IMEI_SV, a device model and software version can be ascertained. For example, all iPhone 14s running iOS16.0 will belong to a set of IMEI TAC ranges and will have the same IMEI_SV value. When Apple® makes changes to radio modem and packages those changes into a new iOS release (iOS16.1), it also iterates the IMEI_SV value.

Further, when UE identifying information, including the IMEI and IMEI_SV, is received from a wireless device for the first time, the UE capability repository system operates to store the identifying information, or more specifically, a portion of the identifying information. For example, the UE capability repository system may store the TAC of the IMEI. When the UE capability information message is received, the UE capability repository system operates to store the UE capability information message in conjunction with the TAC and IMEI_SV, so that the identifying information and the capabilities are correlated with one another in the UE capability repository system.

Accordingly, when a connecting UE sends its IMEI and IMEI_SV, the UE capability repository system can check for the TAC of the IMEI and the IMEI_SV in the repository and determine if a UE capability information message is stored in combination with the TAC and IMEI_SV. When a match is found, it is not necessary to receive another UE capability information message from the connecting UE. Instead, the stored capability information message can be utilized and the UE capability repository system can instruct the access node not to send a UE capability enquiry, thus eliminating the overhead associated with the transmission of both the UE capability enquiry and the UE capability information message.

The above described UE capability repository system could reside in the access node (eNB/gNB), mobility management component of the core network, e.g., mobility management entity (MME) or access and mobility function (AMF). The UE capability repository system could alternatively operate both within core elements and access nodes. As a further alternative, the UE capability repository system can function as a logically discrete element that would be accessed by the other network elements, such as the access node, MME, or AMF.

Embodiments disclosed herein include an improved method for minimizing overhead that results in improved overall performance for network devices. By reducing the sending of UE capability enquiries and UE capability information messages, performance is maintained for wireless devices in the network by reduction of overhead. For example, various wireless device models are extremely popular and millions of them may be connected to a network and each and every one of these devices may exchange capabilities with the network. By implementing techniques disclosed herein, only one of those millions of devices may need to send a UE capability information message.

In embodiments set forth herein, the network may be a 4G LTE network 5G NR network or a combined 4G/5G network. Other networks are within scope of the disclosure. Wireless devices may travel throughout the network connecting with various access nodes. An exemplary system described herein includes at least a UE capability repository system operating in conjunction with a core network, at least one access node (or base station), such as an eNB, or gNB, and a plurality of end-user wireless devices. Further, multiple access nodes may be utilized. For example, some wireless devices may communicate with an LTE eNB and others may communicate with an NR gNB.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

In addition to the systems and methods described herein, the operations for reducing overhead by eliminating transmission of UE capability enquiries and UE capability information messages may be implemented as computer-readable instructions or methods and processing nodes on the network for executing the instructions or methods. The processing node may include a processor included in the access node or a processor included in any controller node in the wireless network that is coupled to the access node.

FIG. 1 depicts an exemplary system 100 for wireless communication, in accordance with the disclosed embodiments. The system 100 may include a core network 140, a radio access network (RAN) 110 and multiple wireless devices 122, 124, 126, and 128 able to communicate within the network. The wireless devices 122, 124, 126, and 128 may be end-user wireless devices and may operate within one or more coverage areas 112 and communicate with the RAN 110 over communication links 104, which may for example be 5G NR communication links, 4G LTE communication links, or any other suitable type of communication link. Further, a UE capability repository system 180 is shown as a discrete system in communication with both the core network 140 and the RAN 110. However, in further embodiments presented herein, the UE capability repository system 180 may be integrated with either the core network 140 or an access node within the RAN 110 or with both the core network 140 and the RAN 110.

Figure 7:
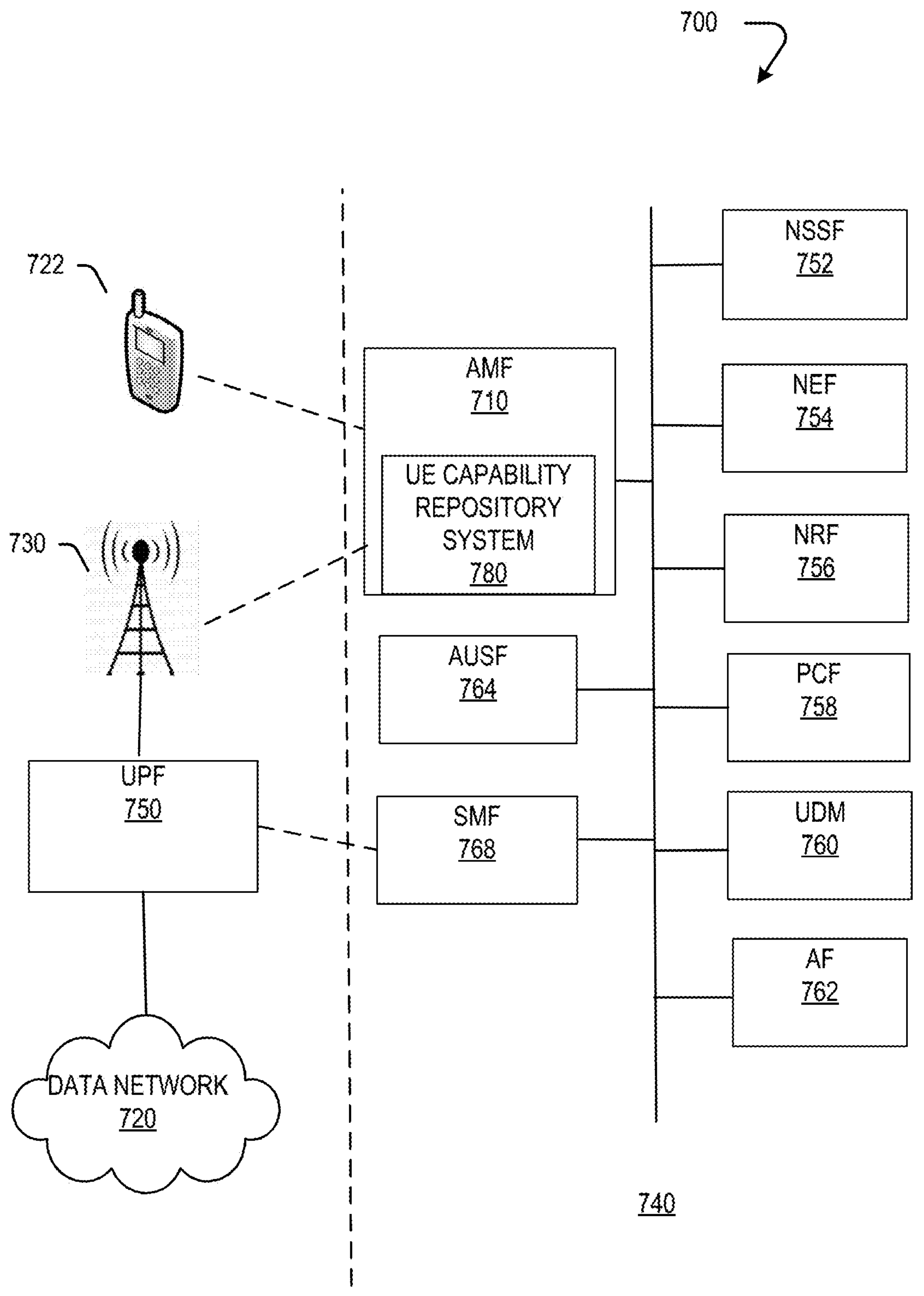
FIG. 7 is a block diagram illustrating a 5G core in accordance with embodiments described herein.
Figure 8:
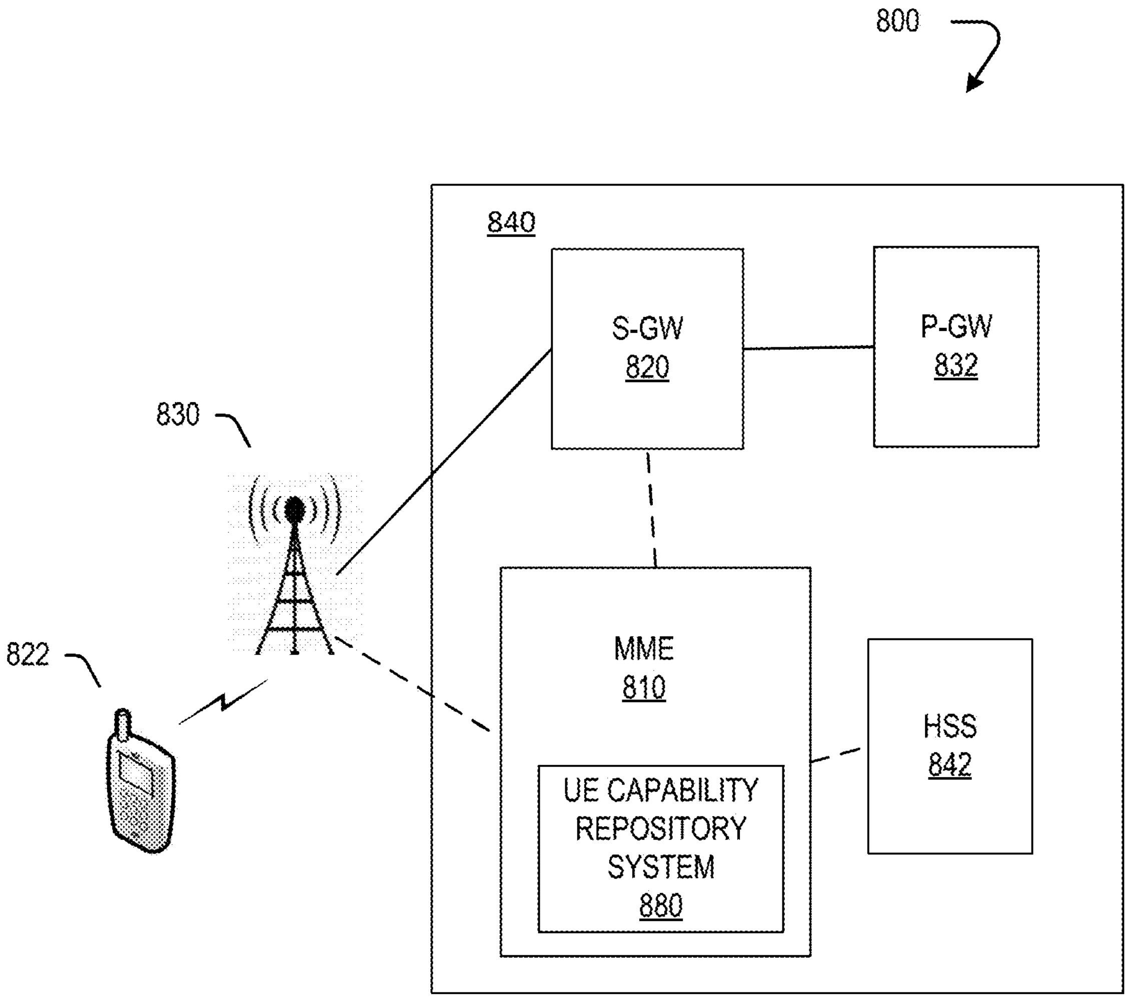
FIG. 8 is a block diagram illustrating a 4G core in accordance with embodiments described herein.

The core network 140 includes core network functions and elements 125. The core network may have an evolved packet core (EPC) structure or may be structured using a service-based architecture (SBA). The network functions and devices 125 may be separated into user plane functions 120 and control plane functions 150. In an SBA architecture, service-based interfaces may be utilized between control-plane functions, while user-plane functions connect over point-to-point links. FIGS. 7 and 8, which are further described below, illustrate further implementation details of the core network functions and elements 125.

The RAN systems and devices 130 may include various access network systems and devices 130. The RAN systems and devices 130 are disposed between the core network 140 and the end-user wireless devices 122, 124, 126, 128. Some of the systems and devices 130 may communicate directly with the core network 140 and others may communicate directly with the end user wireless devices 122, 124, 126, 128. Other systems and devices 170 may communicate with one another within the RAN in order to provide services from the core network 140 to the end-user wireless devices 122, 124, 126, and 128.

The RAN 110 includes at least an access node (or base station), such as an eNodeB, a next generation NodeB (gNodeB) communicating with a plurality of end-user wireless devices. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNB and others may communicate with an NR gNB.

Access nodes can be, for example, standard access nodes such as a macro-cell access node, a base transceiver station, a radio base station, an eNB device, an enhanced eNB device, a next generation NodeB (or gNB) in 5G New Radio ("5G NR"), or the like. In additional embodiments, access nodes may comprise two co-located cells, or antenna/transceiver combinations that are mounted on the same structure. Alternatively, access nodes may comprise a short range, low power, small-cell access node such as a microcell access node, a picocell access node, a femtocell access node, or a home eNodeB device.

Access nodes can be configured to deploy at least two different carriers, each of which utilizes a different RAT. For example, a first carrier may be deployed by an access node in an LTE mode, and a second carrier may be deployed by an access node in an NR mode. Thus, in an embodiment, the access node may comprise two co-located cells, or antenna/transceiver combinations that are mounted on the same structure. In some embodiments, multiple access nodes may be deployed and each access node may support a different RAT. For example, a gNodeB may support NR and an eNodeB may provide LTE coverage. Any other combination of access nodes and carriers deployed therefrom may be evident to those having ordinary skill in the art in light of this disclosure.

The access nodes can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can send and receive audio or data. The wireless devices may be or include high power wireless devices or standard power wireless devices. The wireless devices may further include Internet of Things (IoT) devices. Other types of communication platforms are possible.

In embodiments further described herein, each wireless device may have an associated IMEI and IMEI_SV. For purposes of illustration, wireless devices 122, 124, 126, and 128 are described herein as including particular identifying information and capabilities. As further discussed with reference to FIGS. 2-4, wireless device 122 and 124 may have the same make and model and thus the same IMEI TAC. Further, devices 122 and 124 may have the same software version and thus the same IMEI_SV. Wireless device 126 is presumed to have the same make and model as wireless devices 122 and 124, thus sharing the same IMEI TAC, but has a different software version and thus a different IMEI_SV value. For the sake of illustration, wireless device 128 is presumed to be a different model entirely than devices 124, 126, and 128 and thus has a different IMEI TAC.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 110 and the core network 140.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for overhead reduction may be implemented as computer-readable instructions or methods, and processing nodes on the network for executing the instructions or methods. The processing node may include a processor included in the access node or a processor included in any controller node in the wireless network that is coupled to the access node.

Figure 2:
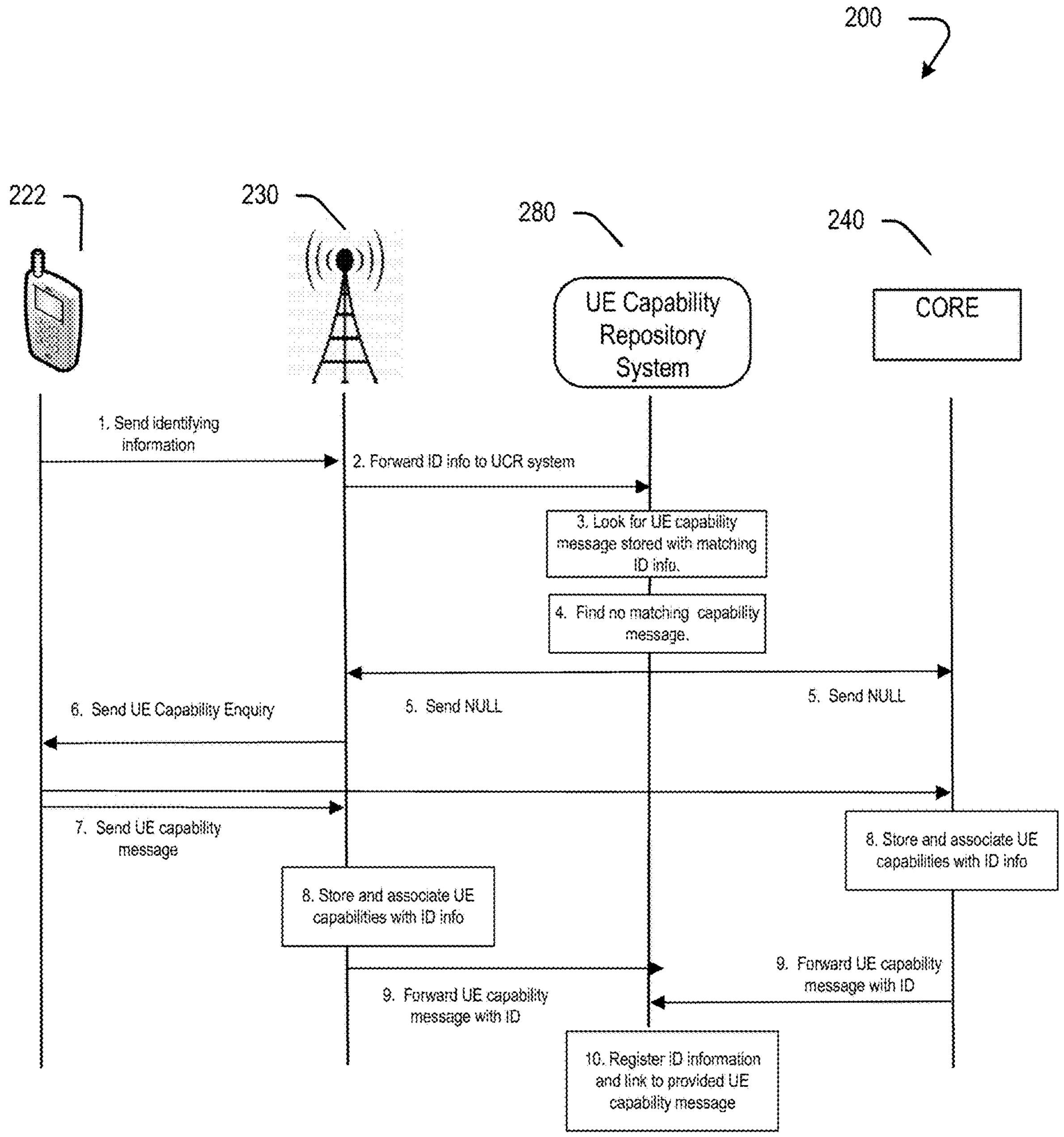
FIG. 2 is a flow diagram illustrating network components performing methods described herein.

FIG. 2 is a flow diagram 200 further illustrating interaction between a wireless 222, access node 230, UE capability repository system 280 and core network 240. In the illustrated embodiment, wireless device 222 has the characteristics described above with respect to wireless device 122 and is associated with an IMEI TAC and an IMEI_SV. Further, the access node 230 and core network 240 are substantially similar to those described above with respect to FIG. 1. The embodiment illustrated in FIG. 2 occurs when the wireless device 222 has not previously connected to the network.

In order to connect to the access node 230, the wireless device 222 sends its identifying information including its IMEI and IMEI_SV to the access node 230 in step 1. The access node 230 may be or include, for example, an eNB or a gNB. The access node 230 forwards the identifying information in step 2 to the UE capability repository system 280, which is similar to or the same as the UCR system 180 described above with reference to FIG. 1.

The UCR system 280 includes a processor that performs multiple steps upon receipt of the identifying information from the access node 230. In step 3, the UCR system processor looks for a UE capability information message stored with a matching IMEI TAC and IMEI_SV. If it does not find a matching UE capability message in step 3, it sends a NULL value to both the access node 230 and the core network 240.

The receipt of the NULL value at the access node 230 triggers the sending of a UE capability enquiry by the access node 230 to the UE 222 in step 6. In response, the UE 222 sends a UE capability information message to the access node 230 and the core network 240 in step 7. In step 8, both the access node 230 and the core network 240 store and associates the UE capability message with identifying information of the UE 222. The access node 230 and the core network 240 also may associate and store a globally unique temporary identifier (GUTI) for the wireless device 122, which is a shorter identifier used for the wireless device 222. The GUTI is a temporary ID assigned for security purposes. The GUTI may be assigned to the device by the core network 240, for example by an access and mobility function (AMF) or a mobility management entity (MME). The GUTI has two parts including one part that identifies the devices and another which identifies the network.

In step 9, the access node 230 and core network 240 forward the UE capability information message with the identifying information (e.g., IMEI TAC and IMEI-SV) to the UCR system 280. Finally, in step 10, the UCR system 280 registers the identifying information and links it to the provided UE capability message in a capability repository of the UCR system 280. More specifically, the UCR system 280 stores the IMEI TAC and the IMEI_SV in combination with the received UE capability information message.

As a result of the process described above with respect to FIG. 2, if a new device having the same IME TAC and IMEI_SV as the wireless device 222 connects to the network in the future, the new device will not be required to send a UE capability information message. Instead the UCR system 280 will send the capability message to the access node 230, thus eliminating the overhead associated with the process of the UE capability enquiry and the responsive UE capability information message. The process of connection for the new UE is illustrated and described below with respect to FIG. 3.

Figure 3:
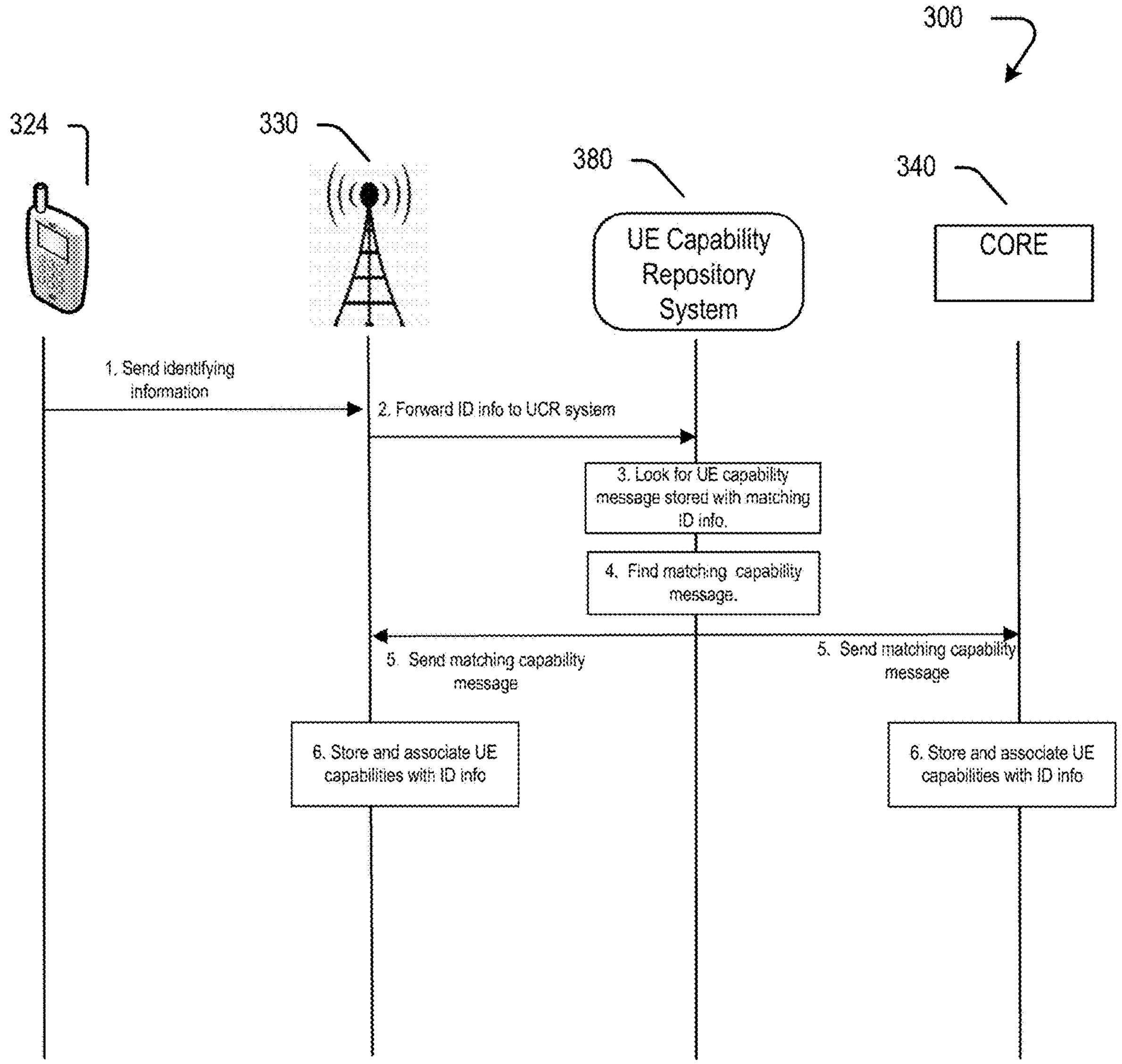
FIG. 3 is a flow diagram illustrating network components performing methods described herein.

FIG. 3 is a flow diagram 300 further illustrating interaction between a wireless 324, access node 330, UE capability repository system 380 and core network 340. The access node 330 may be the same as or similar to the access node 230. The core network 340 may be the same as or similar to the core network 240. Further, the capability repository system 380 may be the same as or similar to the UCR systems 180 and 280. In the illustrated embodiment, wireless device 324 has the characteristics described above with respect to wireless device 124 and is associated with an IMEI TAC and an IMEI_SV. The embodiment illustrated in FIG. 3 occurs when the wireless device 324 has not previously connected to the network.

In order to connect to the access node 330, the wireless device 324 sends its identifying information including its IMEI and IMEI_SV to the access node 330 in step 1. The access node 330 may be or include, for example an eNodeB or a gNodeB. The access node 330 forwards the identifying information in step 2 to the UE capability repository system 380, which is similar to the UCR systems 180 and 280 described above with reference to FIGS. 1 and 2.

The UCR system 380 includes a processor that performs multiple steps upon receipt of the identifying information from the access node 330. In step 3, the UCR system processor looks for a UE capability message stored with a matching IMEI TAC and IMEI_SV. In this case, because the UE 324 has a matching IMEI TAC and IMEI_SV with the UE 222, the UCR system 380 finds a matching UE capability message in step 4.

In step 5, the UCR system 380 sends the matching capability system to the core network 340 and to the access node 330. In response, in step 6, both the access node 330 and the core network 340 store the associated UE capability message along with the profile for the device 324 and the GUTI discussed above. Thus, the access node 330 refrains from sending a UE capability enquiry and the UE 324 does not send a UE capability message, thereby eliminating the overhead associate with these messages.

Figure 4:
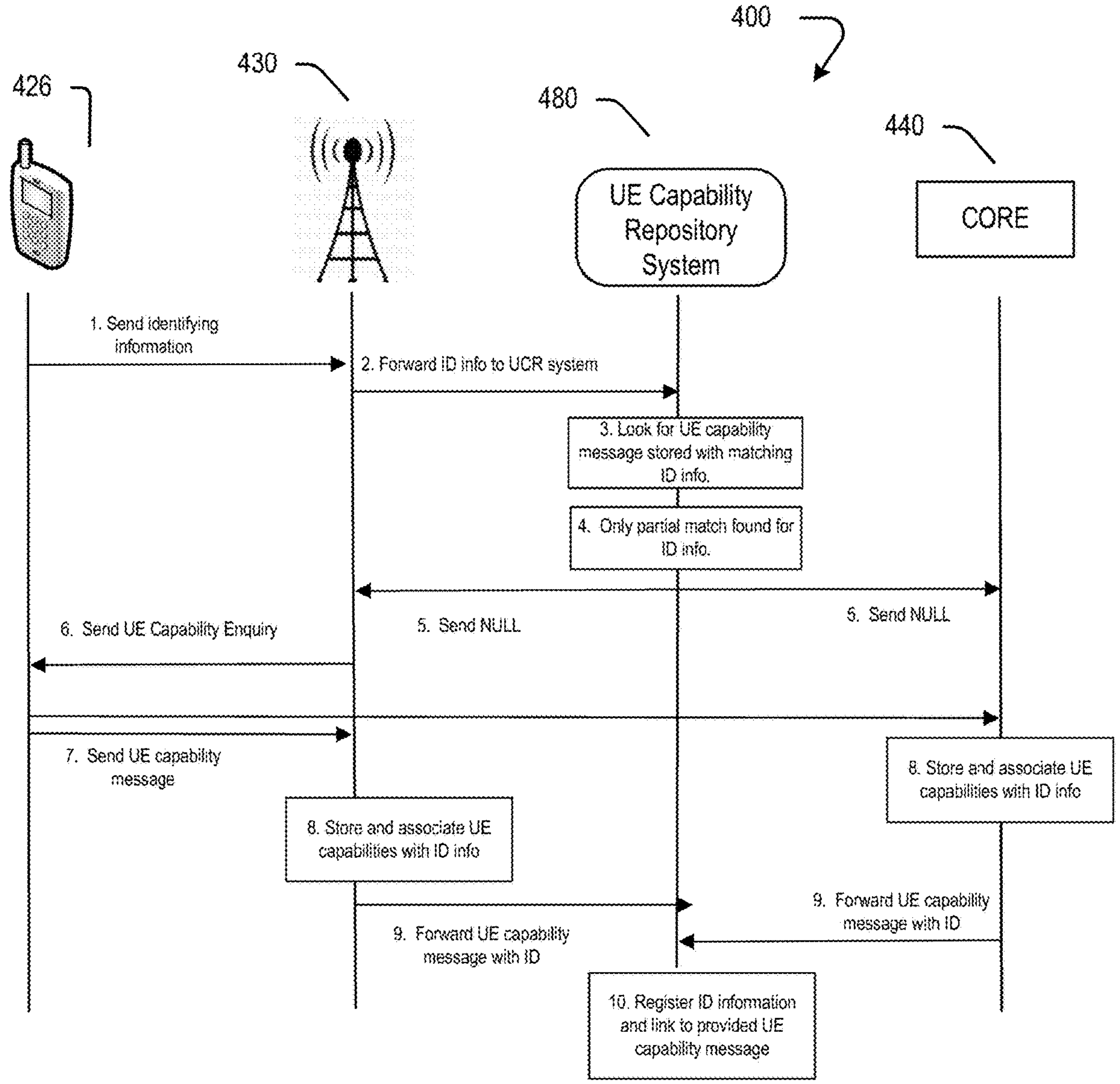
FIG. 4 is a flow diagram illustrating network components performing methods described herein.

FIG. 4 is a flow diagram 400 further illustrating interaction between a wireless 426, access node 430, UE capability repository system 480 and core network 440. While the access node 430, UCR system 480 and core network 440 are the same as or similar to their counterparts described above with reference to FIGS. 1-3, in the illustrated embodiment, wireless device 426 has the characteristics described above with respect to wireless device 126 and is associated with an IMEI TAC and an IMEI_SV. In the embodiment illustrated in FIG. 4., it is presumed that wireless device 426 has not previously connected to the network. As set forth above with respect to FIG. 1, wireless devices 126 and 426 have the same IMEI TAC as devices 122, 222, 124, and 324, but a different IMEI_SV.

In order to connect to the access node 430, the wireless device 426 sends its identifying information including its IMEI and IMEI_SV to the access node 430 in step 1. The access node 430 may be or include, for example, an eNodeB or a gNodeB. The access node 430 forwards the identifying information in step 2 to the UCR system 480

The UCR system 480 includes a processor that performs multiple steps upon receipt of the identifying information from the access node 430. In step 3, the UCR system processor looks for a UE capability message stored with a matching IMEI TAC and IMEI_SV. Note that as described above, the wireless device 126 is presumed to have the same make and model as wireless devices 122 and 124, thus sharing the same IMEI TAC, but has a different software version and thus a different IMEI_SV value. Thus, in step 4, the UCR repository system 480 discovers only a partial match found for the identifying information. In step 5, the UCR system 480 treats the partial match as a non-match and sends a NULL value to both the access node 430 and the core network 440.

The receipt of the NULL value at the access node 430 triggers the sending of a UE capability inquiry by the access node 430 to the UE 126 in step 6. In response, the UE 426 sends a UE capability message to the access node 430 and the core network 440 in step 7. In step 8, both the access node 430 and the core network 440 store and associate the UE capability message with identifying information of the UE 126 along with the GUTI. In step 9, the access node 430 and core network 440 forward the UE capability message with the identifying information to the UCR system 480. Finally, in step 10, the UCR system 480 registers the identifying information and links it to the provided UE capability message in a capability repository of the UCR system 480. More specifically, the UCR system 480 stores the IMEI TAC and the IMEI_SV received from the wireless device 126 in combination with the received UE capability message.

As a result of the process described above with respect to FIG. 4, if a device having the same IME TAC and IMEI_SV as the wireless device 126 connects to the network in the future, the device will not be required to send a UE capability message. Instead the UCR system 480 will send the capability message to the access node 430, thus eliminating the overhead associated with the process of the UE capability enquiry and the responsive UE capability message.

The embodiment of FIG. 4 also applies for the wireless device 128, which has the same IMEI_SV as the devices 122 and 124, but a different IMEI. This is also considered to be a partial match and thus a non-match, triggering the flow of FIG. 4

Later, if any of the above devices 122, 124, 126, 128, reattaches to the network, or traverse across tracking area or MME or AMF boundaries, where updated information is needed, the UE need not send the UE capability information message as it can be queried based upon the GUTI sent by the UE, which is then cross referenced at the access node or core network with the previously stored IMEI TAC and IMEI_SV.

Figure 5:
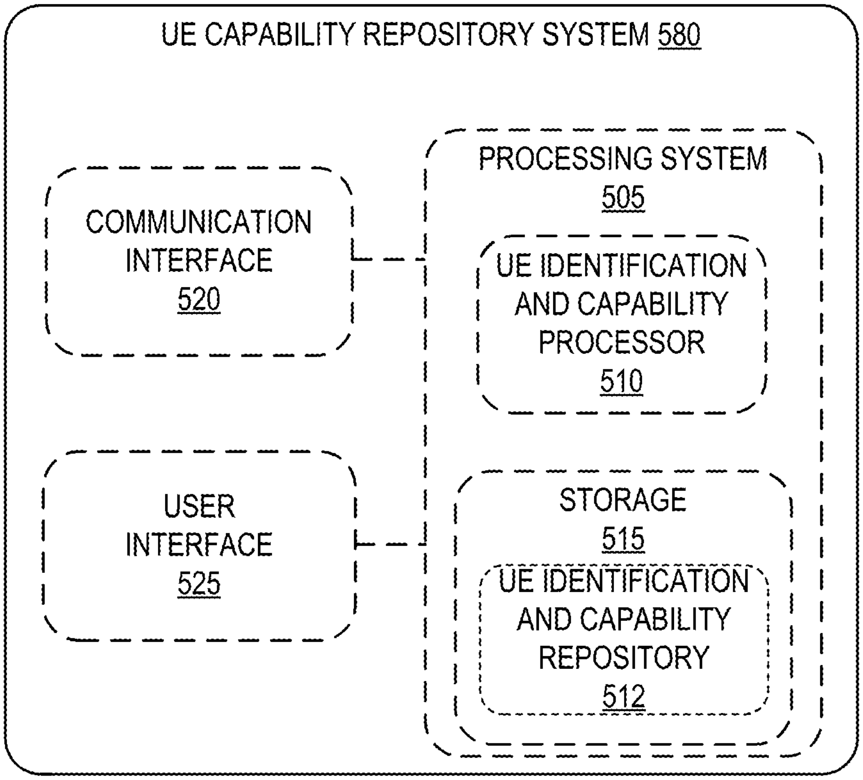
FIG. 5 is a block diagram illustrating a UE capability repository system in accordance with disclosed embodiments.

FIG. 5 depicts an exemplary UE capability repository system 580, which may be configured to perform the methods and operations disclosed herein to provide overhead reduction by managing UE capability information messages. In the disclosed embodiments, the UE capability repository may be incorporated in an access node, in the core network, or as a separate and discrete component as shown in FIG. 1.

The UE capability repository (UCR) system 580 may be configured for matching UE identifying information with UE capability information messages. To perform the matching, the UCR system 580 may include a processing system 505. Processing system 505 may include a UE identification and capability processor 510 and a storage device 515 storing a UE identification and capability repository 512. Storage device 515 may include a disk drive, a flash drive, a memory, or other storage device configured to store data and/or computer readable instructions or codes (e.g., software). The computer executable instructions or codes may be accessed and executed by the UE identification and capability processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein, such as those operation discussed above with respect to FIGS. 2-4 and those further discussed with respect to the methods illustrated in FIGS. 9 and 10. The UE identification and capability processor 510 may be a microprocessor and may include hardware circuitry and/or embedded codes configured to retrieve and execute software stored in storage device 515.

The UE capability repository system 580 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to the UE capability and repository system 580 and to receive data or information from the UCR system 580. User interface 525 may include hardware components, such as touch screens, buttons, displays, speakers, etc. The UCR system 580 may further include other components such as a power management unit, a control interface unit, etc.

Figure 6:
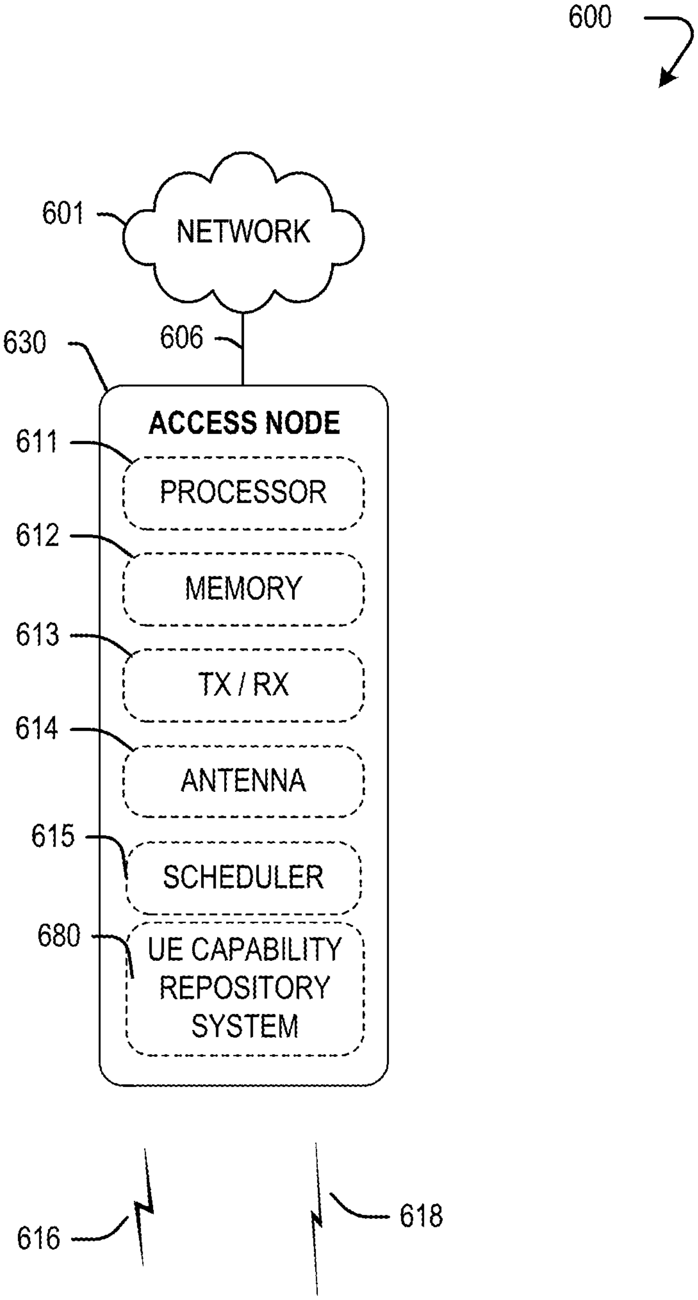
FIG. 6 is a block diagram illustrating an access node in accordance with embodiments described herein.

FIG. 6 depicts an exemplary environment 600 for a UCR system 680 in accordance with one embodiment. The UCR system 680 incorporated in the environment 600 may be the same as or similar to the UCR system 580 described above. The illustrated environment 600 includes an access node 630. The access node 630 can include, for example, a gNodeB or an eNodeB. Access node 630 is illustrated as comprising a processor 611, memory 612, transceiver(s) 613, and antenna(s) 614. Processor 611 executes instructions stored on memory 612, while transceiver(s) 613 and antenna (s) 614 enable wireless communication with other network nodes, such as wireless devices and other nodes. For example, wireless devices may initiate communications such that the transceivers 613 and antennas 614 receive messages from the wireless devices, for example, over communication links 616 and 618 and pass the messages to a mobility entity in the core network. Further, the transceiver (s) 613 and antenna(s) 614 receive signals from a core mobility entity such as an MME or AMF and pass the messages to the appropriate wireless device Scheduler 615 may be provided for scheduling resources based on the presence and performance parameters of the wireless devices. The access node 630 may connect with a network 601.

In embodiments set forth herein, the access node 630 is further be provided with a UCR system 680. The UCR system 680 may incorporate the components as described above with respect to FIG. 5 in order to match UE capabilities with UE identifying information in order to reduce overhead created by the automatic sending of UE capability information messages. Based on determinations made by the UCR system 680, the access node 630 may send or refrain from sending UE capability enquiries to wireless devices utilizing antennas 614. When no UE capability enquiry is sent, the wireless devices do not send UE capability information messages.

FIG. 7 illustrates another exemplary environment 700 for a UCR system 780. The UCR system 780 may be the same as or similar to the UCR systems described above with respect to FIGS. 5 and 6. The environment 700 includes a 5G core network 702 having multiple network functions as well as wireless device 722 and an access node 730. The core network functions include, for example, multiple control plane functions and a user plane function (UPF 750). The user plane function (UPF) 750 access a data network 720 and performs operations such as packet routing and forwarding, packet inspection, policy enforcement for the user plane, quality of service (QOS) handling, etc. The control plane functions may include, for example, a network slice selection function (NSSF) 752, a network exposure function (NEF) 754, a network repository function (NRF) 756, a policy control function (758), a unified data management (UDM) function 760, an application function (AF) 762, an access and mobility function (AMF) 710, an authentication server function (AUSF) 764, and a session management function (SMF) 768. Additional or fewer control plane functions may also be included.

The AMF 710 receives connection and session related information from the wireless devices 722 and is responsible for handling connection and mobility management tasks. SMF 768 is primarily responsible for creating updating and removing sessions and managing session context. The UDM function 760 provides services to other core functions, such as the AMF 710, SMF 768 and NEF 754. The UDM function 760 may function as a stateful message store, holding information in local memory. The NSSF 752 can be used by the AMF 710 to assist with the selection of network slice instances that will serve a particular device. Further, the NEF 320 provides a mechanism for securely exposing services and features of the core network.

In the illustrated embodiment, the UCR system 780 is incorporated in the AMF 710. The core network functions and elements as illustrated form a micro services based architecture, which may include network functions distributed over different cloud infrastructures. Additionally many services may span different network functions and domains that work in unison. Other core functions and elements 125 may also be included as would be known to one skilled in the art.

FIG. 8 illustrates an exemplary environment 800 for a UCR system 880. The UCR system 880 may be the same as or similar to the UCR systems 580, 680, and 780 discussed above. The environment 800 includes a 4G core network 802 having multiple network functions as well as wireless device 822 and an access node 830. The core network 840 may be, for example an evolved packet core (EPC) and may include a serving gateway (S-GW) 820 and a packet gateway (P-GW) 832. The functions of the S-GW 820 and the P-GW 832 resemble those of the UPF 750 discussed above with reference to FIG. 7. The S-GW 820 is the point of interconnect between the radio-side and the EPC 840. As its name indicates, this gateway serves the UE 822 by routing the incoming and outgoing IP packets. The P-GW 832 is the point of interconnect between the EPC 802 and the external IP networks. The P-GW 832 also performs various functions such as IP address/IP prefix allocation or policy control and charging.

The core network 840 may further include a mobility management entity (MME) 810 and a home subscriber server (HSS) 842. The MME 810 handles the signaling related to mobility and security. The HSS 842 is a database that contains user-related and subscriber-related information. It also provides support functions in mobility management, call and session setup, user authentication and access authorization. In embodiments provided herein, the UCR system 880 is integrated with the MME 810.

Although FIG. 6 shows the UE capability repository system 680 located in the access node 630 and FIGS. 7 and 8 show the UE capability repository system 780, 880 located in the core network 740, 840, an additional embodiment allows for the functionality to be split between the access node in and the core. For example, UE capability repository data may be in one location and the processing components for operating on the UE capability repository may be disposed in another location.

Figure 9:
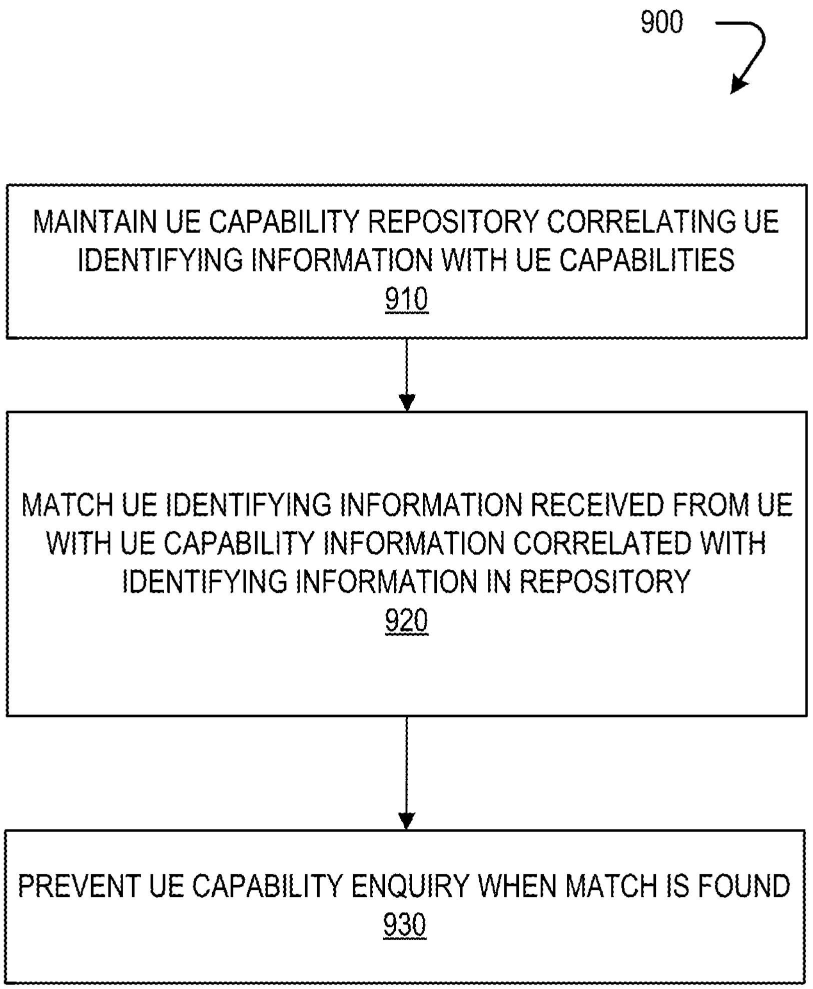
FIG. 9 is a flow chart depicting a method for reducing overhead in accordance with disclosed embodiments.

The disclosed methods for overhead reduction through UE capability information message management are further described with reference to FIGS. 9 and 10 below. FIG. 9 illustrates an exemplary method 900 performed by a UCR system for overhead reduction. Method 900 may be performed by any suitable processor discussed herein, for example, the UE identification and capability processor 510 shown in FIG. 5. As explained above, the processor may be located in an access node, or core network, or in a separate component communicating with both the access node and the core network.

Method 900 starts in step 910 when the UE identification and capability processor 510 maintains a UE capability repository 512 correlating UE identifying information with UE capabilities. In order to maintain the UE capability repository 512, the UCR system 580 receives identifying information, such as the IMEI TAC and IMEI_SV, that is transmitted from wireless devices to the access nodes. The UCR system 580 also receives UE capability information messages that are transmitted from the UEs and builds and maintains the UE capability repository 512 using the UE identification and capability processor 510.

Further, in step 920, the UE identification and capability processor 510 leverages information stored in the UE capability repository 512 to assist in processing connection requests from wireless devices. Thus, in step 920, the UEs transmit identifying information to the access node and the access node transmits the identifying information to the UCR system 580, which may be located within the access node itself, in the core network, or in an entirely separate component. The UE identification and capability processor 510 compares the received identifying information with information in the UE capability repository 512 to find matching identifying information. When matching identifying information (i.e., the IMEI TAC and IMEI_SV) is found, the UE identification and capability processor 510 searches for a matching UE capability information message. Thus, for example, if the UE identification and capability processor 510 finds a matching IMEI TAC and IMEI-SV for a wireless devices, it then searches for a correlated UE capability information message.

In step 930, when the identification and capability processor 510 has found a matching UE capability information message, it takes steps to prevent the transmission of a UE capability information message in order to reduce overhead. For example, the UE identification and capability processor 510 sends a NULL value to the access node and the core network to indicate that no UE capability enquiry should be generated and transmitted from the access node. In the absence of the UE capability enquiry, the UE will not send a UE capability information message. Accordingly, overhead is reduced by preventing transmission of the information message.

Figure 10:
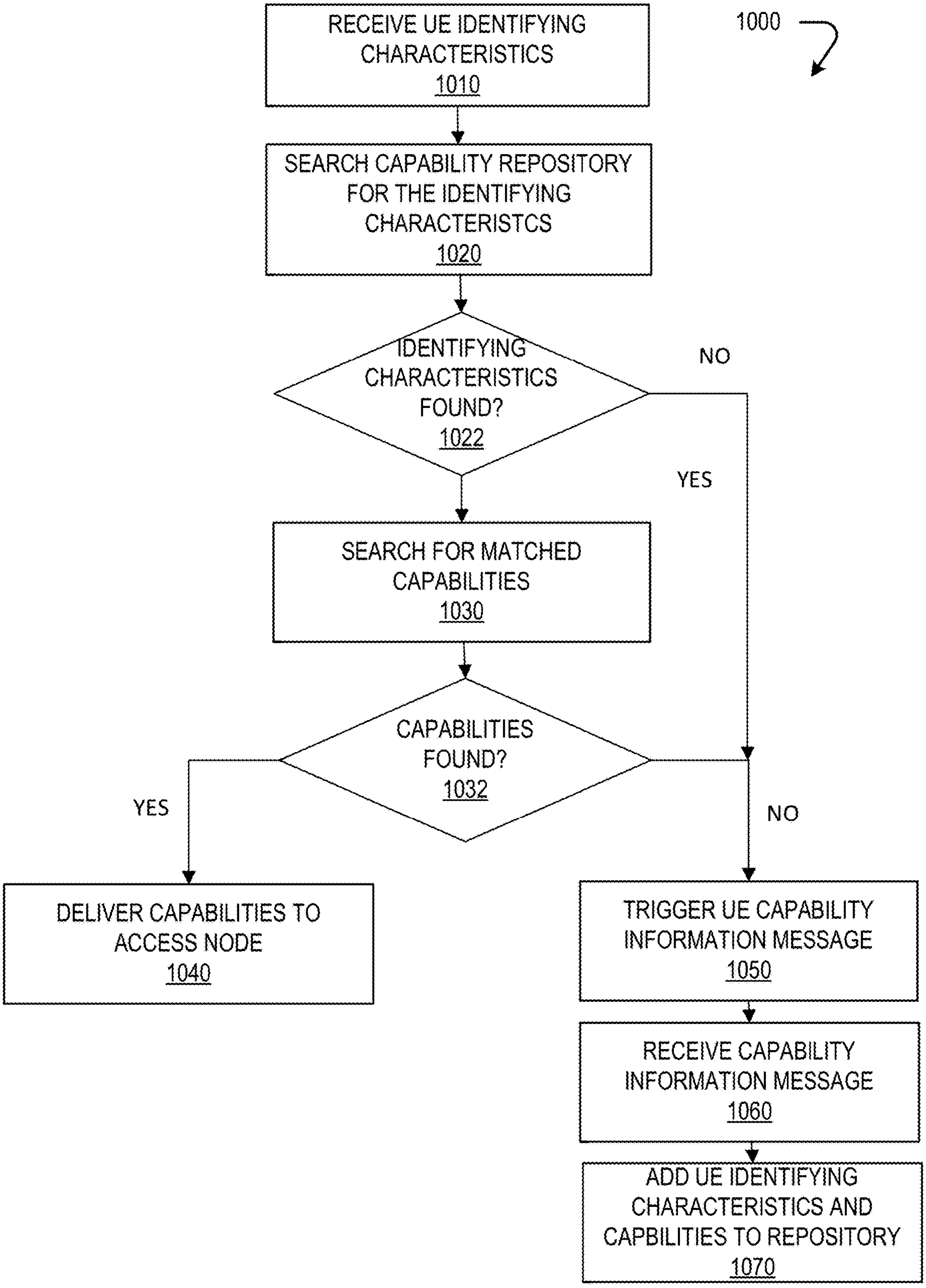
FIG. 10 is a flow chart depicting an additional method for reducing overhead in accordance with disclosed embodiments.

FIG. 10 illustrates a method 1000 for uplink overhead reduction in accordance with disclosed embodiments. Method 1000 may be performed by a processor, for example a UE identification and capability processor 510. For the sake of illustration, the method is described as being performed by the UE identification and capability processor 510 interacting with an access node such as access node 230 that receives communications from multiple wireless devices, such as wireless devices 122, 124, 126, and 128.

In step 1010, the UE identification and capability processor 510 receives UE identifying characteristics. In embodiments set forth herein, the UE identification and capability processor 510 receives the identifying characteristics from an access node upon the receipt of the identifying characteristics in a connection request from a wireless device. The identifying characteristics may include, for example, an IMEI TAC and IMEI_SV.

In step 1020, the UE identification and capability processor 510 searches the UE capability repository 512 for the identifying characteristics. For example, the UE identification and capability processor 510 searches for the received IMEI and IME_SV stored together in the UE capability repository 512.

If the identifying characteristics are not found in the UE capability repository 512 in step 1022, a UE capability information message is triggered in step 1050. The triggering occurs when the UE capability repository system 580 sends a message to the access node to generate a UE capability enquiry. In response to the UE capability enquiry from the access node, the wireless device 122, 124, 126, 128 sends the capability information message to the access node 230 and the core network 240. The access node 230 and core network 240 may associate the UE capability message with a profile of the wireless device, which includes the IMEI TAC, IMEI_SV, and GUTI. The access node 230 may further transmit the capability information message to the UCR system 580. Thus, in step 1060, the UE capability repository system 580 receives the UE capability information message and adds the UE identifying characteristics including the IMEI TAC and IMEI_SV to the UE capability repository 512 in step 1070.

However, if the UE identification and capability processor 510 finds a match in step 1022, it then searches for a correlated UE capability message in step 1030. If a correlated capability message is not found in step 1032, the UE identification and capability processor again triggers a UE capability information message in step 1050 as described above. However, if a correlated UE capability message is found in step 1032, the UE identification and capability processor 510 delivers the matching capability message to the access node 230 and core network 240. The access node 230 and core network 240 then stores the capability message as a part of the device's profile including the IMEI TAC, IMEI_SV, and GUTI. This process thus avoids the necessity for sending a UE capability enquiry from the access node to trigger the UE capability information message. The elimination of the UE capability enquiry and UE capability information message thereby reduce overhead associated with these messages.

In some embodiments, methods 900 and 1000 may include additional steps or operations. Furthermore, the methods may include steps shown in each of the other methods. As one of ordinary skill in the art would understand, the methods 900 and 1000 may be integrated in any useful manner.

By the methods described herein, network device performance can be improved by reducing the overhead associated with the transmission of UE capability messages. Further, the customer service level for both 4G and 5G networks will improve in various scenarios. Further, embodiments herein may have the greatest utility in systems involving IoT devices. When the wireless devices 122, 124, 126, and 128 are IoT devices, these devices typically do not offer users an opportunity to turn features on or off to adjust capabilities. Thus, because these devices have a relatively constant capability message that is unlikely to change over time, the sending of repeated capability messages is entirely unnecessary and overhead is greatly reduced.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

maintaining, in a memory device operating within an access node of a wireless network, a user equipment (UE) capability repository storing information correlating identifying characteristics of UEs with capabilities of the UEs;

in response to a connection request from a particular UE, the connection request including UE identifying characteristics comprising an international mobile equipment identity (IMEI) type allocation code (TAC) and an IMEI software version (SV) for the particular UE, searching the UE capability repository for UE capabilities correlated with the IMEI TAC and the IMEI SV for the particular UE;

upon finding the UE capabilities correlated with the IMEI TAC and the IMEI SV:

refraining from sending a UE capability enquiry message to the particular UE; and providing a core network of the wireless network with the UE capabilities;

determining that the particular UE has not previously connected to the wireless network; and in response to determining that the particular UE has not previously connected to the network, storing an association of the UE identifying characteristics for the particular UE and the correlated UE capabilities with a globally unique temporary identifier (GUTI) for the particular UE at the access node and the core network; and in response to finding a partial match of only the IMEI TAC or the IMEI SV transmitting a NULL message to the core network.

2. The method of claim 1, further comprising, upon failure to find the UE capabilities correlating with the UE identifying characteristics;

triggering sending of a UE capability information message to the access node from the particular UE;

receiving the UE capability information message; and updating the UE capability repository with UE capabilities contained in the UE capability information message.

3. The method of claim 2, wherein the triggering comprises triggering the sending of the UE capability information message by returning a NULL value to a core network and sending a UE capability enquiry.

4. The method of claim 1, wherein the UE identifying characteristics include a make and model of the UE.

5. The method of claim 1, further comprising upon finding the partial match of only the IMEI TAC or the IMEI_SV:

triggering sending of a UE capability information message to the access node from the particular UE;

receiving the UE capability information message; and updating the UE capability repository with UE capabilities contained in the UE capability information message.

6. A system comprising;

a memory device storing, at an access node of a wireless network, a user equipment (UE) capability repository correlating identifying characteristics of user equipment with capabilities of UEs; and a processing device operating within a wireless network, the processing device performing operations including;

in response to a connection request from a particular UE, the connection request including UE identifying characteristics comprising an international mobile equipment identity (IMEI) type allocation code (TAC) and an IMEI software version (SV) for the particular UE, searching the UE capability repository for UE capabilities correlated with the IMEI TAC and the IMEI SV for the particular UE;

upon finding the UE capabilities correlated with the IMEI TAC and the IMEI SV:

refraining from sending a UE capability enquiry message to the particular UE; and providing a core network with the UE capabilities;

determining that the particular UE has not previously connected to the wireless network; and in response to determining that the particular UE has not previously connected to the network, storing an association of the UE identifying characteristics for the particular UE and the correlated UE capabilities with a globally unique temporary identifier (GUTI) for the particular UE at the access node and the core network;

upon finding a partial match of only the IMEI TAC or the IMEI SV, transmitting a NULL message to the core network; and upon failure to find the UE capabilities correlating with the identifying characteristics, triggering sending of a UE capability information message to the access node from the particular UE, receiving the UE capability information message, and updating the UE capability repository with the UE capabilities contained in the UE capability information message.

7. The system of claim 6, wherein the UE capabilities are sent to a mobility management entity (MME) or access and mobility function (AMF) of the core network.

8. The system of claim 6, wherein the system is disposed within a processing node communicating with the access node and an AMF or MME of the core network.

9. The system of claim 6, wherein, upon failure to find the UE capabilities, the processing device triggers the sending of the UE capability information message by returning a NULL value to the core network and and the sending of the UE capability enquiry.

10. The system of claim 6, wherein the UE identifying characteristics include a make and model of the particular UE.

11. The system of claim 10, wherein the identifying characteristics further include a software version of the particular UE.

12. The system of claim 11, further comprising identifying the particular UE using an IMEI number and an IMEI SV.

13. The system of claim 1, further comprising receiving the IMEI number.

14. The system of claim 6, wherein upon finding the partial match of only the IMEI TAC or the IMEI_SV:

triggering sending of the UE capability information message to the access node from the particular UE;

receiving the UE capability information message; and updating the UE capability repository with UE capabilities contained in the UE capability information message.

15. A non-transitory computer-readable medium storing instructions that when executed by a processor cause the processor to perform operations comprising:

in response to a connection request from a particular user equipment (UE) to a wireless network, the connection request including UE identifying characteristics comprising an international mobile equipment identity (IMEI) type allocation code (TAC) and an IMEI software version (SV) for the particular UE, searching a UE capability repository for UE capabilities correlated with the IMEI TAC and the IMEI SV for the particular UE;

upon finding the UE capabilities correlated with the IMEI TAC and the IMEI SV:

providing an access node with the UE capabilities;

determining that the particular UE has not previously connected to the wireless network;

in response to determining that the particular UE has not previously connected to the network, storing an association of the UE identifying characteristics for the particular UE and the correlated UE capabilities with a globally unique temporary identifier (GUTI) for the particular UE at the access node and a core network;

upon finding a partial match of only the IMEI TAC or the IMEI SV, transmitting a NULL message to the core network; and upon failure to find the UE capabilities correlating with the UE identifying characteristics, triggering sending of a UE capability information message to the access node from the particular UE, receiving the UE capability information message, and updating the UE capability repository with the capabilities contained in the UE capability information message.

16. The non-transitory computer-readable medium storing instructions of claim 15, wherein upon finding the partial match of only the IMEI TAC or the IMEI_SV, further causing the processor to perform operations comprising:

triggering sending of the UE capability information message to the access node from the particular UE;

receiving the UE capability information message; and updating the UE capability repository with UE capabilities contained in the UE capability information message.

* * * * *